Dec. 8, 1970　　　　L. B. BENKERT ET AL　　　　3,546,556
UNIVERSAL POWER CONTROL MODULE FOR PORTABLE TOOL
OR APPLIANCE CONTROL SYSTEMS
Filed Nov. 29, 1967　　　　　　　　　　　　3 Sheets-Sheet 1

Inventors
Lawrence B. Benkert
Merlin R. Dummer
By Wm. A. Autio
Attorney

Dec. 8, 1970     L. B. BENKERT ET AL     3,546,556
UNIVERSAL POWER CONTROL MODULE FOR PORTABLE TOOL
OR APPLIANCE CONTROL SYSTEMS
Filed Nov. 29, 1967     3 Sheets-Sheet 2

Inventors
Lawrence B. Benkert
Merlin R. Dummer
By Wm. A. Autio
Attorney

Dec. 8, 1970    L. B. BENKERT ET AL    3,546,556
UNIVERSAL POWER CONTROL MODULE FOR PORTABLE TOOL
OR APPLIANCE CONTROL SYSTEMS
Filed Nov. 29, 1967    3 Sheets-Sheet 3

Inventors
Lawrence B. Benkert
Merlin R. Dummer
By *Wm. A. Autio*
Attorney

United States Patent Office 3,546,556
Patented Dec. 8, 1970

3,546,556
UNIVERSAL POWER CONTROL MODULE FOR PORTABLE TOOL OR APPLIANCE CONTROL SYSTEMS
Lawrence B. Benkert, Brookfield, and Merlin R. Dummer, Milwaukee, Wis., assignors to Cutler-Hammer, Inc., Milwaukee, Wis., a corporation of Delaware
Filed Nov. 29, 1967, Ser. No. 686,606
Int. Cl. H02p 5/06
U.S. Cl. 318—345                   5 Claims

ABSTRACT OF THE DISCLOSURE

A self-enclosed solid state electric power control module of universal application adapted to be inserted in any available space within the housing of a portable electric tool or appliance. The module has electric conductors extending out from the insulated housing. A variable resistor and a switch are separately mounted on the tool or appliance in locations for easy manipulation when the tool is being used and connect an electric power supply to the module conductors.

BACKGROUND OF THE INVENTION

This invention relates to the portable tool and appliance control art and more particularly to power control systems that are small enough to be mounted on any tool or appliance and controlled concurrently with use thereof. Power control systems completely mounted within or on the tool housing have been known heretofore. In one prior form, a solid state power control circuit has been mounted on a panel which forms the bottom plate of a portable drill housing and is controlled by a trigger switch and a thumb-operated variable resistor for speed control. However, this power control circuit has been specially adapted for a particular drill and is not available for general use. And in another prior form, the elements of a power control circuit have been individually mounted to the inner walls of a drill handle and connected to a separately mounted trigger switch and potentiometer for speed control. This circuit also does not have the convenience and economy of universal use since the mounting structure of each circuit element must be adapted to the particular tool or appliance in which the system is used. In still another prior form, the elements of a power control circuit have been enclosed within the base of a trigger switch and the switch and variable resistor also have been built thereinto to provide a unitary self-enclosed unit for use in portable drills. This device also does not have the universality of application since it is limited to use with trigger lever operated tools. Others have used a separate box for mounting the control circuit into which the electric cord is plugged. However, none of these arrangements provide for use of the control circuit within tools or appliances other than that for which it was designed and, thus, do not have the advantage of universality of application therewith or with different switches and variable control devices.

SUMMARY OF THE INVENTION

This invention relates to a power control system for a portable tool or appliance incorporating a self-enclosed power control module of universal application; that is, it may be inserted in any available space within the tool or appliance housing and electrically connected to a switch and variable resistor whereby its power output may be controlled or adjusted. This module is small enough to be inserted within a hand tool or appliance and is adapted for use with different types of switches such as trigger switches, slide button or pushbutton switches or the like and with different types of variable resistors such as rotary, linear or pivotal action. This provides the advantages that the module may be mass produced more economically and reduces the number of different types of parts that must be stocked. Moreover, the module itself is constructed and arranged so that it is economical to manufacture, easy to assemble and efficient in operation.

An object of the invention is to provide an improved power control system incorporating a power control circuit module having universal application.

A more specific object of the invention is to provide a small self-enclosed power control module that may be used with different types of switches and variable control devices in different tools and appliances.

Another specific object of the invention is to provide a small self-enclosed and insulated power control module that may be inserted in available space within different tools or appliances and connected to the characteristic control devices thereof.

Other objects and advantages of the invention will hereinafter appear.

BRIEF DESCRIPTION OF THE DRAWINGS

These and other objects and advantages of the invention and the manner of obtaining them will best be understood by reference to the following description of a preferred embodiment of a universal power control module for tool or appliance control systems taken in conjunction with the accompanying drawings, wherein.

DESCRIPTION OF THE PREFERRED EMBODIMENTS

Figure 1:
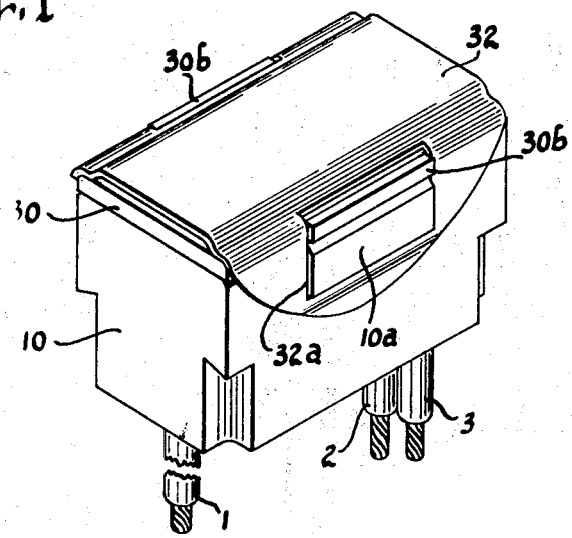
FIG. 1 is an enlarged isometric view of a universal power control module constructed in accordance with the invention.
Figure 2:
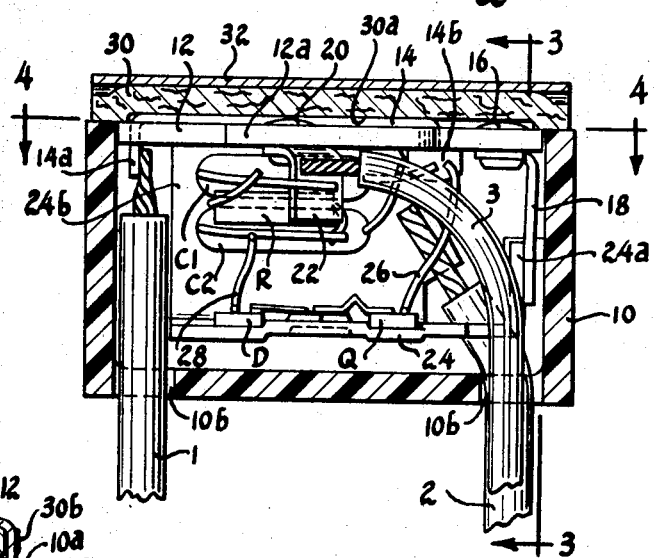
FIG. 2 is an enlarged cross-sectional view of the module taken along line 2—2 of FIG. 3.
Figure 3:
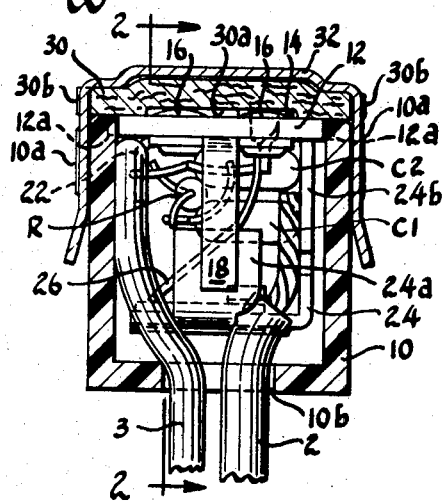
FIG. 3 is an enlarged cross-sectional view of the module taken along line 3—3 of FIG. 2.

Referring to FIGS. 1–3, there is shown a self-enclosed power control module of the solid state type. While an alternating current control module, hereinafter described in connection with FIG. 5, has been shown for illustrative purposes, it will be apparent that a half-wave rectified or full-wave rectified control circuit or the like may alternatively be housed within the base of the module.

As shown in FIG. 1, the module is provided with an insulating housing comprising a base 10 of insulating material such as molded plastic or the like. This base is generally rectangular in shape having a bottom and two side walls and two end walls and being open at the top. The two side walls which are longer than the end walls are provided externally with means for retaining a metal frame. This means, for exemplary purposes, is shown as a rectangular projection 10a molded integrally with and extending longitudinally near the upper center of each side wall over which apertured skirts of the frame are snapped as hereinafter more fully described. The bottom of the base is provided with a transversely elongated hole 10b adjacent each end wall through which connection conductors such as electric wires extend.

Figure 4:
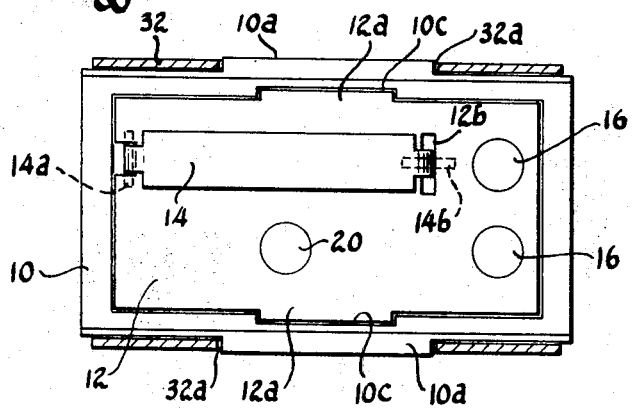
FIG. 4 is an enlarged cross-sectional view of the module taken along line 4—4 of FIG. 2.

Within the base there is provided a subassembly which is put together before it is inserted into the base. This subassembly comprises an insulating mounting board 12 onto which the circuit components are mounted as shown in FIGS. 2, 3 and 4. This mounting board 12 is a flat rectangular plate having short lateral projections 12a shown in FIG. 4 which fit into complementary grooves 10c at the top of the sidewalls of the base to provide a first supporting means for the plate. As a second supporting means, the internal corners of the base may be provided with integrally molded inclusions (not shown) up to the level of grooves 10c to support the four corners of plate 12 and to fix it so that it fills the open top of the base.

Mounting board 12 is provided with means for mounting circuit components in suspended relation thereunder. This means comprises an electrically conductive terminal strip 14 lying flat on the upper surface along one side of the board as shown in FIG. 4 with one end tab 14a bent down below and end notch in the board and with the other end tab 14b bent down and inserted through an aperture 12b in the board. Both ends of the strip are notched on opposite sides where they pass through the board leaving a winged end tab below the board. The end notch in the board is narrow as shown in FIG. 4 to prevent winged tab 14a from rising therethrough above the board. Winged tab 14b is twisted 90 degrees to secure the strip to the board and to provide an electric terminal therebelow.

Circuit board 12 is also provided with a pair of rivets 16 shown in FIG. 4 for securing a connector 18 therebelow as shown in FIGS. 2 and 3. A third rivet 20 is provided in the circuit board near its midportion alongside strip 14 as shown in FIG. 4 for securing an electric terminal 22 therebelow as shown in FIGS. 2 and 3.

As shown in FIGS. 2 and 3, connector 18 extends downwardly near one end wall of the base and is welded to an upwardly bent tab 24a of a heat sink 24. This heat sink has a generally flat horizontal portion onto which solid state elements are mounted and a vertically bent portion 24b which is flat and substantially coextensive with the horizontal portion to provide a large area for heat dissipation. This vertically bent portion 24b extends up along one side wall of the base so that it does not take up very much space.

Figure 5:
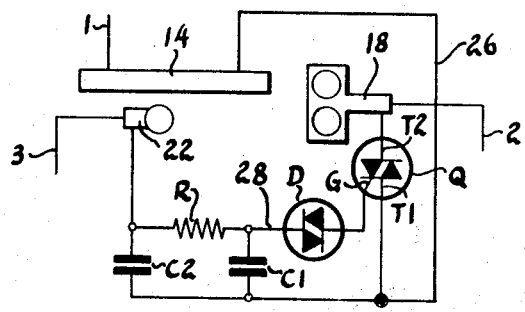
FIG. 5 is a schematic diagram of the control circuit within the module.

A Quadrac Q and a diac D are mounted on this heat sink. Referring to FIGS. 2 and 5, the heat sink forms terminal T2 of the Quadrac and is connected to external conductor 2 whereas terminal T1 of the Quadrac is connected through a bare wire 26 to terminal strip 14. Terminal T1 is also connected to first leads of capacitors C1 and C2. The other lead of capacitor C2 is connected through resistor R to the other lead of capacitor C1 which is connected through a bare wire 28 and diac D to gate terminal G of the Quadrac. This other lead of capacitor C2 is also connected to terminal 22 which is connected to external conductor 3. External conductor 1 is connected to terminal strip 14 at its winged tab 14a. As shown in FIG. 2, conductors 2 and 3 extend out through one hole in the base and conductor 1 extends out through the other hole therein for connection to an external control circuit as hereinafter described.

Quadrac Q is an alternating current switching control device of the solid state type such as a bidirectional triode thyristor. That is, it will block current until it is fired by a gate current pulse and will thereafter conduct current across terminals T1 and T2 until the end of the half-cycle even if the firing pulse is terminated.

Diac D is an alternating current breakover device of the solid state type such as a bidirectional diode thyristor. That is, it will block current until a voltage exceeding its breakover voltage is applied causing it to conduct an avalanche of current until the applied voltage decreases below a threshold value whereupon it will restore to its blocking condition. This threshold value depends upon the characteristics of the diac. In the circuit under consideration in FIG. 5, when the voltage on capacitor C1 exceeds such breakover voltage, diac D will discharge capacitor C1 into the gate of the Quadrac to fire the latter into conduction.

Resistor R and capacitor C2 are added to the firing control circuit to reduce the so-called hysteresis effect, that is, firing earlier on the second and subsequent half-cycles than it does on the first half-cycle. This hysteresis effect would require the external variable resistor to be turned to the firing point and then turned back to get the lowest power output. Reducing the hysteresis effect will avoid this turn-back of the variable resistor and will afford firing at substantially the lowest power output initially.

The module is assembled by first threading wire 1 through hole 10a and threading wires 2 and 3 through hole 10b in the bottom of the base. The subassembly is then pressed down into the base until lateral projections 12a of the mounting board seat into grooves 10c in the side walls of the base. This leaves the rivet heads and strip 14 slightly above the level of the side walls of the base. An insulating cover plate 30 having a shallow under-cavity 30a as shown in FIGS. 2 and 3 is placed over mounting board 12, this under-cavity accommodating the rivet heads and the terminal strip. This cover plate is provided with short lateral projections 30b as shown in FIGS. 1 and 3 extending slightly beyond the side walls of the base whereby the cover plate is held in place. A metal frame 32 is snapped over cover plate 30 rigidly to secure it in place. For this purpose, frame 32 has a rectangular upper portion overlying the cover plate and a pair of apertured skirts bent down from its longer edges. This rectangular upper portion may be provided with a contour generally complementary to the contour of the upper surface of cover plate 30 whose midportion is slightly raised due to the formed under-cavity. The apertures 32a in the depending skirts of the frame are large enough to receive molded projections 10a of the base and short projections 30b of the cover plate and to snap thereover when the frame is assembled into place. Projections 30b received in these apertures secure the cover plate in place and prevent it from moving longitudinally.

Figure 6:
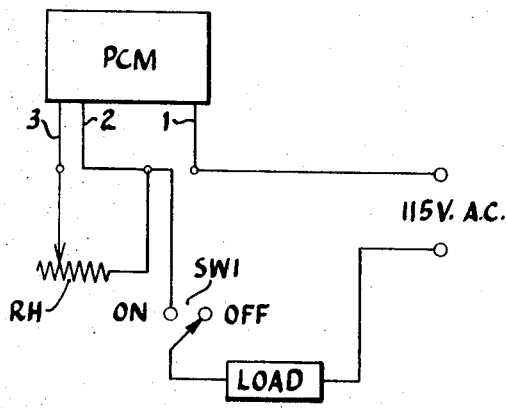
FIG. 6 is a schematic diagram showing the module connected in a power control system combination.

As shown in FIG. 6, the power control module PCM of FIGS. 1–5 may be connected in a power control system combination by connecting one side of an A.C. supply to conductor 1 and connecting the other side of the supply through a load and an on-off switch SW1 to conductor 2. Also, a variable resistor RH is connected between conductors 2 and 3 to afford manual adjustment of the output power. When the tap on variable resistor RH is moved to the right to reduce the resistance, increased current flows to capacitor C2 and through resistor R to capacitor C1. A point is reached on resistor RH where the diac begins to break over and to fire the Quadrac. Each time that this happens, capacitor C1 discharges through the diac into the gate of the Quadrac. When the diac thereafter restores to its blocking condition, capacitor C2 causes current to flow through resistor R to partially recharge capacitor C1 to reduce the hysteresis effect as heretofore mentioned. The capacitors then recharge on the next half-cycle to repeat the firing action but in the opposite direction to provide an A.C. output current to the load.

As will be apparent, switch SW1 in FIG. 6 may be a trigger switch mounted on a portable tool such as the switch disclosed in R. E. Larkin Patent No. 2,988,724, dated June 13, 1961. On the other hand, a slide button switch of the single-pole, single-throw type could be used or even a push-push switch depending upon what is desired on the particular tool or appliance. Also, variable resistor RH, or potentiometer as it is sometimes called, may be a rotary knob type, rotary thumb wheel type, linear type, pivotal type or the like depending upon what is desirable on a particular tool or appliance. The advantage in this module is that it can be used with any one of a variety of switch and variable resistor combinations.

Figure 7:
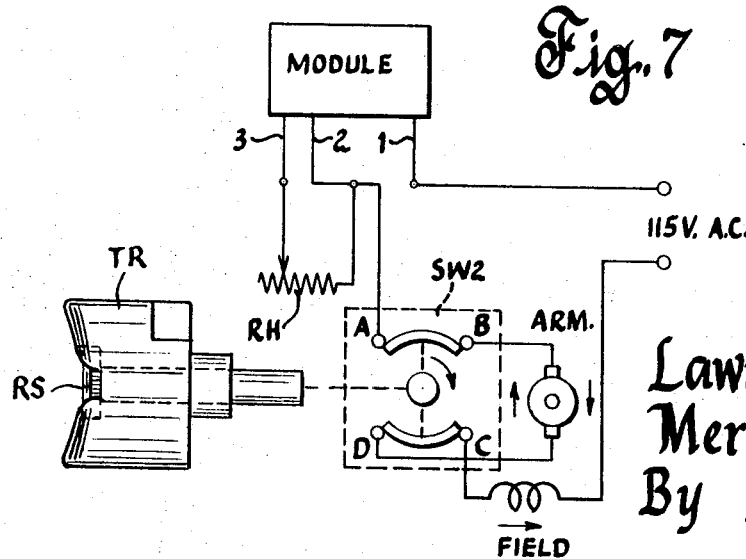
FIG. 7 is a schematic diagram showing the module connected in a modified reversing power control system combination.

Another application of the universal module PCM is shown in FIG. 7 where it is used in connection with a specific type of load and a reversing switch in a motor control system. In this application, variable resistor RH is connected between conductors 2 and 3 as in FIG. 6. One side of the power supply is connected to conductor 1 and the other side is connected to one side of the field winding of a universal motor. The other side of the field winding is connected to terminal C of 4-terminal reversing switch SW2. The armature winding of the motor is connected across terminals B and D of the switch and terminal A thereof is connected to conductor 2 of the module.

Switch SW2 is a reversing switch such as for example the trigger reversing switch shown in H. W. Brown Patent No. 3,143,606, dated Aug. 4, 1964. In this switch, the two bridging contacts may be rotated over two pairs, respectively, of the stationary contacts by rotating selector shaft RS ninety degrees and then pressed into engagement therewith by triggering TR. It will be apparent from FIG. 7 that in the position shown, a first bridging contact may connect stationary contacts A and B and the other bridging contact may connect stationary contacts C and D. This causes the current to flow down through the armature and to the right through the field for a given half-cycle and in the opposite directions on alternate half-cycles whereby the motor will run in one direction. If now the bridging contacts are rotated 90 degrees by the selector shaft that is rotatably mounted in the trigger and then pressed closed by the trigger, one of them will connect contacts B and C and the other will connect contacts D and A. As a result, for the same direction of current flow in the field, the armature current has been reversed in direction to run the motor in the opposite direction. These two bridging contacts are mechanically connected to one another for rotation in unison as indicated by the broken line but are electrically insulated from one another.

Figure 8:
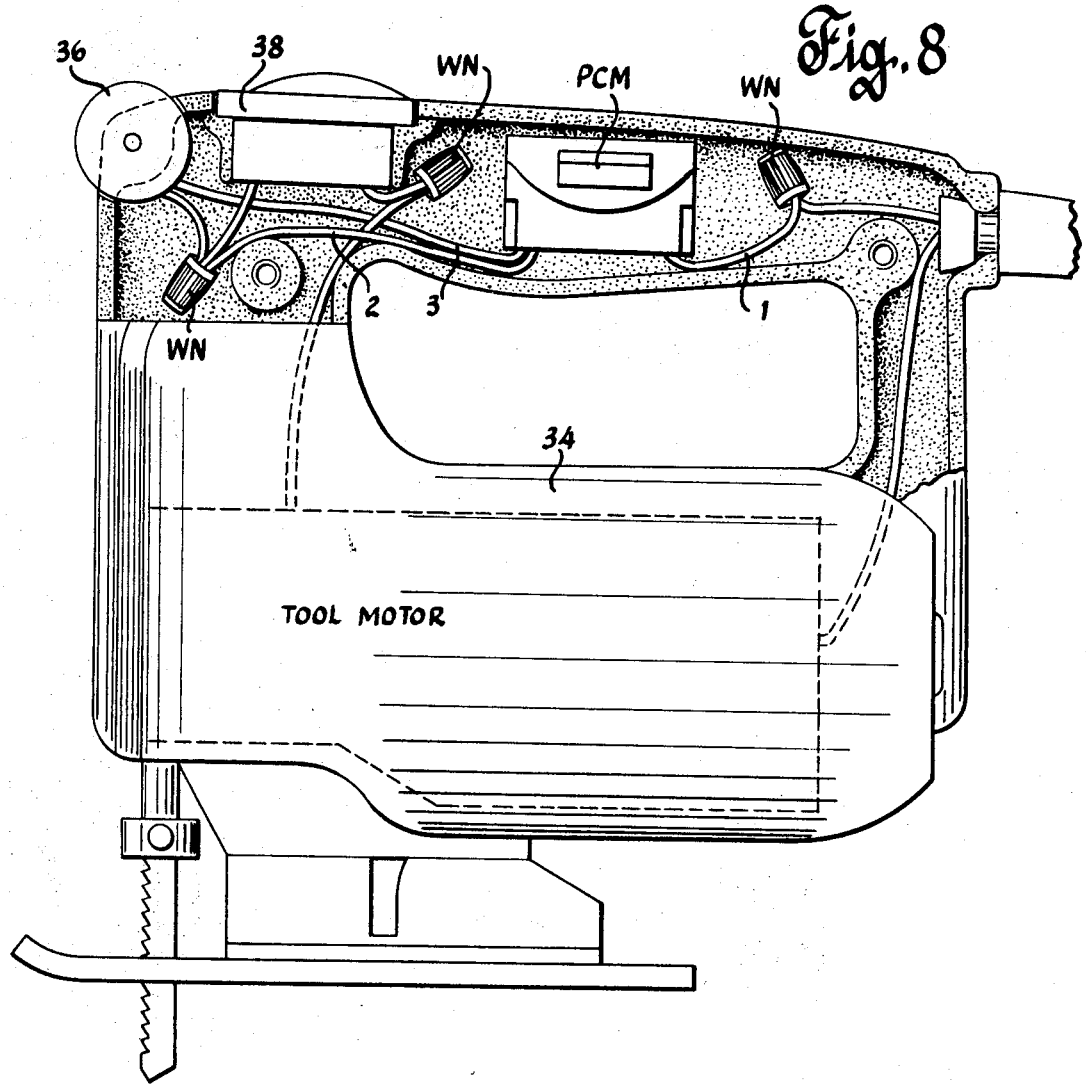
FIG. 8 shows a portable tool with a power control system such as that shown in FIG. 6 mounted thereon.

FIG. 8 shows one way of applying the invention to a portable tool which in this case is a saber saw 34. As shown therein, the power control module PCM is placed in available space within the handle of the tool. This module is connected by the three electric conductors and wiring nuts WN to a variable resistor 36 and a switch 38 and the tool motor to form a power control system whereby the speed of the saber saw may be controlled and adjusted. This power control system is similar to that shown in FIG. 6 if variable resistor RH of the latter is assumed to be of the rotary wheel or knob type such as 36 and if switch SW1 of FIG. 6 is assumed to be of the slide button type such as switch 38. As will be apparent from FIG. 8, both the on-off switch and the speed control thumb-wheel are located on the saber saw so that they are accessible to the thumb of the user, that is, the same hand that manipulates the tool, to afford constant control of the speed as the tool is being used.

While the apparatus hereinbefore described is effectively adapted to fulfill the objects stated, it is to be understood that the invention is not intended to be confined to the particular preferred embodiments of universal power control module for tool or appliance control systems disclosed, inasmuch as they are susceptible of various modifications without unduly departing from the scope of the appended claims.

We claim:

1. A self-enclosed power control module adapted to be inserted entirely within available space within the housing of a portable electric device and to be connected by electric wires to selected ones of a variety of different types of manually operable device-mounted on-off switches and variable resistors and thereby being adapted for universal application to different types and designs of tools, appliances or the like devices, the module comprising:

an insulating hollow base open at the top and having cover retaining means on the walls and holes through which electric wires extend from inside the base for connection to an external system;

an insulating cover closing the top of said base;

snap-on means cooperating with said cover retaining means for securing said cover onto said base;

and a circuit board subassembly inserted as a unit within said base comprising:

an insulating mounting board in the upper portion of said base below said cover;

a power control circuit and means mounting it to said board in suspension therebelow within said base comprising:

a solid state gating type power control element;

a pair of electric wires extending through the holes in said base and means connecting them to first and second main terminals of said solid state element, said wires being adapted to be connected through an external on-off switch and a load to an alternating current power supply;

and a firing control circuit for said solid state element comprising:

a resistance-capacitance firing control network and means connecting it between the gate terminal and the first main terminal of said solid state element;

and a third electric wire connected to said resistance-capacitance network and extending through one of the holes in said base and being adapted to be connected to one side of a manually adjustable resistor whose other side is adapted to be connected to the wire of said pair which is also connected to the second main terminal of said solid state element to enable the adjustable resistor to be used for selective adjustment of the firing angle of said solid state element.

2. The invention defined in claim 1, wherein:

said means mounting said power control circuit to said board comprises electric connectors and means rigidly securing them to said board;

and said cover comprises a shallow under-cavity therebelow providing clearance for said connectors and their securing means while the peripheral portions of said cover engage said base.

3. A power control system for a portable electric appliance comprising:

a self-enclosed power control module adapted to be accommodated entirely within available space in the housing of the appliance and having electric wires adapted to connect it to a switch and variable control resistor and an alternating current power supply, said module comprising:

a hollow insulating base open at the top and having frame securing means on its side walls and holes at the bottom for electric wires;

an insulating cover closing the top of said base;

a frame overlying said cover and having depending tabs cooperating with said frame securing means to attach said frame to said base and to clamp said cover therebetween;

and a circuit board subassembly within the base comprising:

a power control circuit and means mounting it to said board in suspension therebelow as a subassembly before being inserted in said base comprising:

a solid state gating type power control element;

first and second electric wires extending through the holes in the base and means connecting them respectively to the first and second main terminals of said solid state element, said wires being adapted to be connected through an external switch and a load to the A.C. power supply;

and a firing control circuit for said solid state element comprising:

a trigger element connected to the gate terminal of said solid state element;

a variable time delay breakover voltage control network and means connecting it between said trigger element and the first main terminal of said solid state element for developing a break-over voltage for said trigger element having a controllable relation with respect to the cyclic supply voltage;

and a third electric wire connected to said variable time delay network and extending out through one of the holes in said base and being adapted to be connected to a variable control resistor which is also connected to said second wire extending from the second main terminal of said solid state element.

4. The invention defined in claim 3 said resistor being a manually operable variable resistor adapted for independent mounting on the portable electric appliance and being connected between said second and third electric wires to control timed build-up of said break-over voltage during a half-cycle of the supply voltage.

5. The invention defined in claim 4:

said switch being a manually operable trigger reversing switch adapted for independent mounting on the portable electric appliance and being connected in circuit with the load between one side of the power supply and one of the two first mentioned electric wires whereby to connect power to the power control module and afford reversal of load operation.

References Cited

UNITED STATES PATENTS

| | | | |
|---|---|---|---|
| 3,221,192 | 11/1965 | Franklin | 310—50 |
| 3,225,232 | 12/1965 | Turley et al. | 310—50 |
| 3,327,196 | 6/1967 | Sahrbacker | 310—50 |
| 3,328,613 | 6/1967 | Gawron | 310—50 |
| 3,336,490 | 8/1967 | Yelpo et al. | 310—50 |
| 3,484,632 | 12/1969 | Opalenik | 310—68 |

OTHER REFERENCES

Howell, E. K.: Trial Control for A.C. Power, May 1964, G.E. Applications Notes, 321-OT.

ORIS L. RADER, Primary Examiner

T. LANGER, Assistant Examiner

U.S. Cl. X.R.

310—50